(12) United States Patent
Gruhl

(10) Patent No.: US 6,823,361 B2
(45) Date of Patent: Nov. 23, 2004

(54) COMPUTATIONALLY EFFICIENT, PLATFORM-INDEPENDENT DATA TRANSFER PROTOCOL

(75) Inventor: Daniel Frederick Gruhl, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 748 days.

(21) Appl. No.: 09/757,046

(22) Filed: Jan. 8, 2001

(65) Prior Publication Data
US 2002/0129091 A1 Sep. 12, 2002

(51) Int. Cl.[7] .............................................. G06F 15/16
(52) U.S. Cl. ...................... 709/203; 709/230; 709/231; 715/513
(58) Field of Search ................................ 709/203, 230, 709/231, 201, 232, 236, 237, 246; 715/513

(56) References Cited

U.S. PATENT DOCUMENTS

| | | | | |
|---|---|---|---|---|
| 5,754,772 A | * | 5/1998 | Leaf ............................ | 709/203 |
| 5,991,893 A | * | 11/1999 | Snider .......................... | 714/4 |
| 6,298,346 B1 | * | 10/2001 | Kurosawa .................... | 709/223 |
| 6,345,315 B1 | * | 2/2002 | Mishra ........................ | 709/246 |
| 6,507,856 B1 | * | 1/2003 | Chen et al. .................. | 715/513 |
| 2002/0083331 A1 | * | 6/2002 | Krumel ....................... | 709/237 |

* cited by examiner

Primary Examiner—Zarni Maung
Assistant Examiner—Hassan Phillips
(74) Attorney, Agent, or Firm—John L. Rogitz

(57) ABSTRACT

A computationally efficient, platform-independent data transfer protocol includes executing a depth-first traversal of a data tree representing a query or a query response to generate message elements, each element representing a node or a leaf of the tree. Each element has a name field and preceding the name field, a name size field. Also, each element has a data type field that indicates one of only two type—node or leaf. Following the data type field is a value size field. In the case of node elements, the value size field indicates the number of nodes and/or leaves under the associated node. In the case of leaf elements, the value size field indicates the size of the value contained in the leaf, with a value field immediately following the value size field in leaf elements. The elements are grouped and sent as a message over the Internet.

26 Claims, 2 Drawing Sheets

COMPUTATIONALLY EFFICIENT, PLATFORM-INDEPENDENT DATA TRANSFER PROTOCOL

BACKGROUND OF THE INVENTION

1. Field of the Invention

The present invention relates to systems and methods for transferring data structures in remote procedure calls (RPCs).

2. Description of the Related Art

XML is an ASCII-based language that allows data structures to be exchanged between, e.g., a Web server and a client computer via the Internet. XML allows for the transfer of nested frames of key/value pairs. Typically, in XML, when a client computer wishes to make a procedure call on a remote machine, it generates a request, which must be translated to ASCII-based XML. The request/query is then transmitted to, e.g. a service such as a Web server, which must first parse the ASCII to ensure a recognizable XML request has been received, before processing the query to see what it contains.

Further, when an XML document is transferred with a DTD, the DTD specifies the various data types in the document, but not the size of any values contained in the document. This means that a computer receiving an XML document does not know, prior to completing the parsing process, how large a space it must reserve for the document. Consequently, the present invention understands that computing is rendered relatively more inefficient, since the receiving computer generally compensates for the lack of knowledge of size by initially allocating more space than is usually necessary.

As recognized herein, the representation of XML is ASCII (or unicode), which is an underlying representation that is much more powerful than what is needed for XML. As further recognized herein, this gives rise to the possibility of transmitting documents that may be valid ASCII documents (which are universally recognized) that might not otherwise be valid XML documents (which are not universally recognized absent, e.g., JAVA capability on both the receiving computer and transmitting computer, or C capability on both, and so on). In turn, exploiting the above recognition enables the use of a robust transfer protocol that, while not completely unrestrained, is platform independent and computationally efficient.

SUMMARY OF THE INVENTION

A general purpose computer is programmed according to the inventive steps herein to execute the logic of the present invention. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

Accordingly, a general purpose receiving computer includes logic for accessing at least one data tree, and generating a message including plural elements. Each element is a node element representative of a respective node of the tree or a leaf element representative of a respective leaf of the tree. Each node element has an associated size value indicating a number of leaves or nodes depending from the respective node, whereas each leaf element has an associated size value indicating a size of a value in the respective leaf. The computer transfers the message from the transmitting computer to the receiving computer to establish, e.g., a remote procedure call (RPC) over the Internet.

In a preferred embodiment, each element further includes a name that is representative of the respective node, as well as a name size preceding the name. As set forth in greater detail below, the name size indicates the size of the associated name. Still further, each preferred element includes one of only two data types, node and leaf, and each leaf element further includes a value representing a value of the associated leaf. The logic is accomplished by a depth first traversal of the tree.

In another aspect, a computer-implemented data transfer protocol includes traversing a data tree and generating transfer elements representing nodes and leaves in the tree. Each transfer element includes at least one size value. The transfer elements are transmitted to effect at least one remote procedure call (RPC).

In still another aspect, a computer program device includes a computer program storage device that can be read by a digital processing apparatus. A program is on the program storage device. and the program includes instructions that are executable by the digital processing apparatus for performing method acts for transferring data representative of a tree structure over a wide area computer network. The program includes logic means for generating a platform independent message representing a data tree and a size of at least one characteristic of the data tree. The message also carries information pertaining to the structure of the tree.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
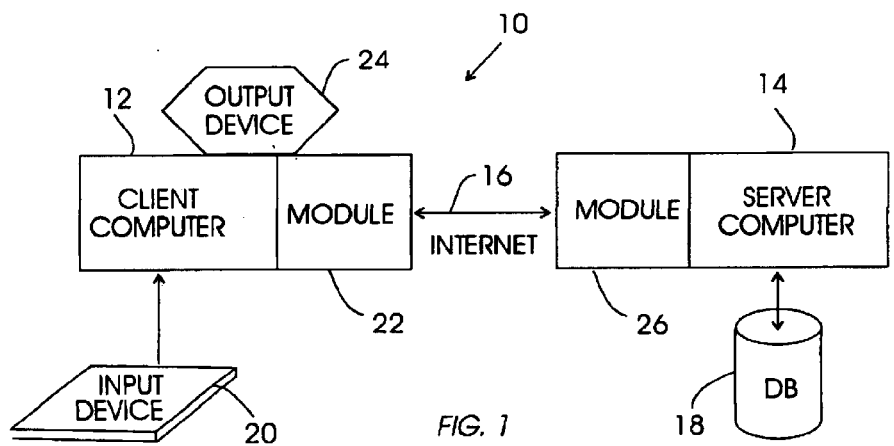
FIG. 1 is a schematic diagram showing the system of the present invention.

Referring initially to FIG. 1, a system is shown, generally designated 10, for implementing a data transfer protocol between a client computer 12 and a server computer 14 via. e.g., the Internet 16. The server computer 14 can access a local or remote database 18.

In one intended embodiment, the computers 12, 14 may be any appropriate computers. For instance, the client computer 12 can be a personal computer, laptop computer, palm top computer, or any other computing device made by International Business Machines Corporation (IBM) of Armonk, N.Y., while the server computer 14 may be any computer, including computers sold under trademarks such as AS400, with accompanying IBM Network Stations. Or, the computer 14 may be a Unix computer, or OS/2 server, or Windows NT server, or IBM workstation or an IBM laptop computer.

As shown in FIG. 1, the client computer 12 is electrically connected to one or more input devices 20, e.g., a mouse or keyboard, which can be manipulated by a user of the system 10 to cause a transfer module 22 of the client computer 12 undertake the logic below. Any data received from the server computer 14 can be output via an output device 24 such as a printer or monitor that are conventionally coupled to the client computer 12. In any case, the transfer logic herein can be executed on the server side by a transfer module 26.

With the above overview of the present architecture in mind, it is to be understood that the present logic is executed by the modules 22, 26 shown in FIG. 1 in accordance with the flow charts discussed below. The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the logic may be embodied by a computer program that is executed by a processor within the computers 12, 14 as a series of computer-executable instructions. These instructions may reside, for example, in RAM of the computers or on a hard drive or optical drive of the computers, or the instructions may be stored on a DASD array, magnetic tape, electronic read-only memory, or other appropriate data storage device. In an illustrative embodiment of the invention, the computer-executable instructions may be lines of compiled $C^{++}$ compatible code.

Figure 2:
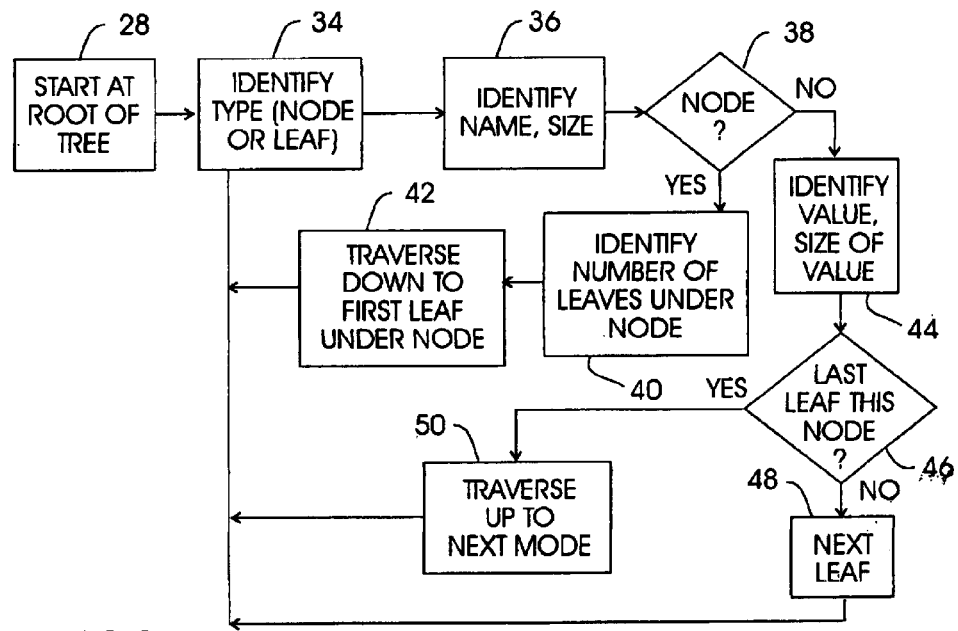
FIG. 2 is a flow chart showing the logic of generating a data structure for transmission.
Figure 3:
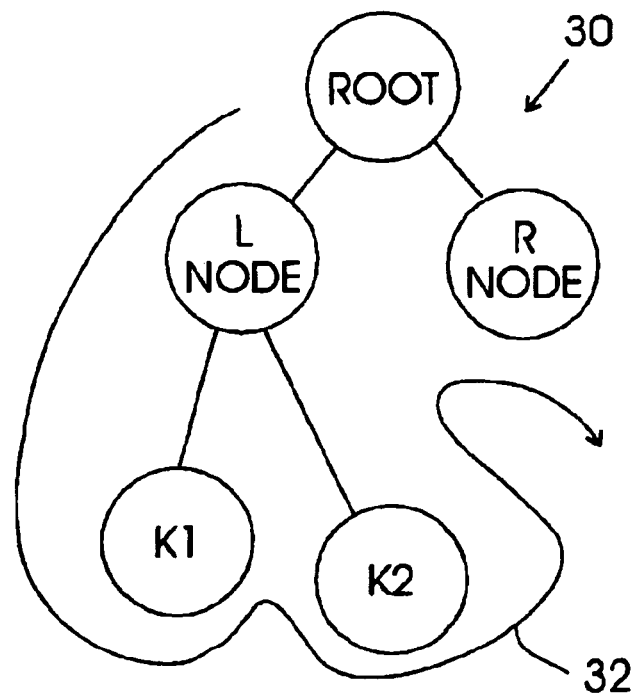
FIG. 3 is a schematic diagram showing how a data tree is parsed by the logic in FIG. 2.

Now referring to FIGS. 2 and 3, the logic of the present platform-independent, robust transfer protocol can be seen. Commencing at block 28, a depth-first traversal of a data tree having nodes and leaves and representing a query, request, or query/request response is commenced at the root of the tree. Such a tree is shown in FIG. 3 and designated 30, with the traversal of the tree, during which the elements of a message representing the tree preferably are generated, being represented by the traverse curve 32.

For the tree element under test (initially, the root), the process moves to block 34 to identify the type of element, i.e., node or leaf. Proceeding to block 36, it is next identified what the name and size of the name of the tree element is. Decision diamond 38 simply represents, in flow chart format, that for nodes, the logic flows to block 40 to identify the number of leaves and/or sub-nodes thereunder, i.e., the number of tree elements that depend from the tree element under test and that are located at most one row below the tree element under test. Then, from block 40 the logic traverses down to the immediately lower tree element, left-most first, to the tree element under test. The logic then loops back to block 34.

In contrast, decision diamond 38 indicates that, when the tree element is a leaf element, the logic flows to block 44 to identify the value and the size of the value in the leaf. Once that is done, the logic determines whether the last leaf of the immediately higher node has been tested at decision diamond 46, and if not the logic retrieves the next leaf element to the right under the node, looping back to block 34. On the other hand, when the last leaf of a node has been tested, the logic flows from decision diamond 46 to block 50, to traverse up and right in the tree to the next untested node.

For the exemplary tree 30 shown in FIG. 3, the above logic results in traversing the tree 30 along the path shown at 32 starting at the root (named "query" for disclosure purposes), then gathering information about the "left" node (the left-most node under the root), then gathering information about leaf K1 (the left-most leaf under the "left" node), followed by gathering information about leaf K2. Then, information is gathered about the "right" node (the node immediately above and to the right of leaf K2).

Once the above information on a tree element has been identified, a message element is generated that contains the information. Alternatively, the entire tree can be traversed and the information saved before generating a message. In either case, a message representing the exemplary tree 30 generated in accordance with the present transfer protocol would be:

| Name Size Field | Name of node/element | type | Size value field | Value (leaves) |
|---|---|---|---|---|
| [5] | Query | <"node"> | [2] | |
| [4] | left | <"node"> | [2] | |
| [2] | K1 | <"leaf"> | [2] | V1 |
| [2] | K2 | <"leaf"> | [2] | V2 |
| [5] | right | <"node"> | [xxx] . . . | |

Thus, cross-referencing the above message and the tree 30, the name of root ("query") has five characters, so the name size field indicates "5". It is a node, so the type indicates "node". Note that the type field can indicate one of only two types—nodes and leaves. Two tree elements (the "left" node and the "right" node) are in the level directly below the root, so the size value field indicates "2". Since the root is not a leaf having a value, the first message element contains no more information. Likewise, the second and fifth message elements represent nodes, and are configured as node elements. However, the third and fourth message elements represent leaves. The name of the first leaf is "K1", and the name is two characters long, so its name size field indicates "2". Its value is V1, also two characters long, so the size value field indicates "2". Likewise, the name of the second leaf is "K2", and the name is two characters long, so its name size field indicates "2". Its value is V2, also two characters long, so the size value field indicates "2".

In general, each element of the message contains a size representing a data tree characteristic, e.g., number of leaves or sub-nodes one level under a node and depending therefrom, or size of value, or other characteristic. In this way, the receiver knows before it receives data how much space to allocate for the data, in contrast to XML.

Figure 4:
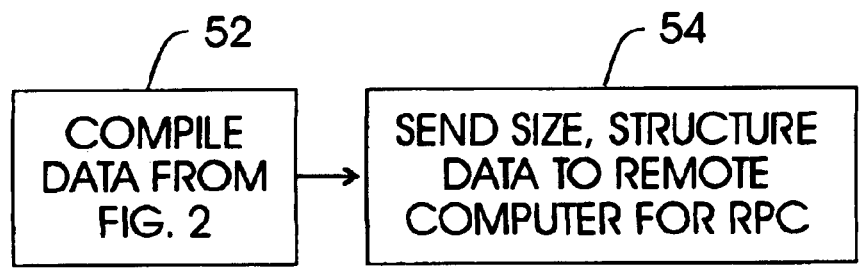
FIG. 4 is a flow chart showing the transfer logic.

FIG. 4 shows that at block 52, the data gathered during tree traversal is assembled in the order in which the message elements were generated. This order consequently represents information about the structure of the tree 30. The message is sent at block 54, with the message thus representing both size and structure information. The message can be sent pursuant to a remote procedure call (RPC).

While the particular COMPUTATIONALLY EFFICIENT, PLATFORM-INDEPENDENT DATA TRANSFER PROTOCOL as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

I claim:

1. A computer system, comprising:
    a general purpose transmitting computer, the computer including logic for undertaking method acts to transfer data to a general purpose receiving computer in communication with the transmitting computer, the method acts undertaken by the logic including:
    accessing at least one data tree; and
    generating a message including plural elements, each element being a node element representative of a respective node of the tree or a leaf element representative of a respective leaf of the tree, each node element having an associated size value indicating a number of leaves or nodes depending from the respective node, each leaf element having an associated size value indicating a size of a value in the respective leaf.

2. The computer of claim 1, wherein the method acts undertaken by the logic further include transferring the message from the transmitting computer to the receiving computer.

3. The computer of claim 1, wherein each element further includes a name representative of the respective node.

4. The computer of claim 3, wherein each element further includes a name size preceding the name, the name size indicating a size of the associated name.

5. The computer of claim 1, wherein each element further includes one of only two data types, node and leaf.

6. The computer of claim 1, wherein the method acts undertaken by the logic are executed in response to a remote procedure call (RPC) over the Internet.

7. The computer of claim 1, wherein the generating act undertaken by the logic is accomplished by a depth first traversal of the tree.

8. The computer of claim 1, wherein each leaf element further includes a value representing a value of the associated leaf.

9. A computer-implemented data transfer protocol, comprising:
    traversing a data tree;
    generating message elements representing nodes and leaves in the tree, each message element including at least one size value; and
    transmitting the message elements to effect at least one remote procedure call (RPC).

10. The computer-implemented method of claim 9, wherein each element is either a node element representative of a respective node of the tree or a leaf element representative of a respective leaf of the tree, each node element having an associated size value indicating a number of leaves or nodes depending from the respective node, each leaf element having an associated size value indicating a size of a value in the respective leaf.

11. The method of claim 10, wherein each element further includes a name representative of the respective node.

12. The method of claim 11, wherein each element further includes a name size preceding the name, the name size indicating a size of the associated name.

13. The method of claim 12, wherein each element further includes one of only two data types, node and leaf.

14. The method of claim 9, wherein the traversing act is accomplished by a depth first traversal of the tree.

15. The method of claim 10, wherein each leaf element further includes a value representing a value of the associated leaf.

16. A computer program device comprising:
    a computer program storage device readable by a digital processing apparatus; and
    a program on the program storage device and including instructions executable by the digital processing apparatus for performing method acts for transferring data representative of a tree structure over a wide area computer network, the program comprising:
        logic means for generating a platform independent message representing a data tree and a size of at least one characteristic of the data tree.

17. The computer program device of claim 16, wherein the tree includes at least one node and at least one leaf, and the characteristic is one of: a number of tree elements under a node, or a size of a value of a leaf.

18. The computer program device of claim 17, wherein the means for generating undertakes a depth-first traversal of the tree.

19. The computer program device of claim 17, further comprising logic means for transferring the message from a transmitting computer to a receiving computer.

20. The computer program device of claim 17, wherein the message includes at least one node element representative of a respective node and at least one leaf element representative of a respective leaf, and each element further includes a name representative of the respective node.

21. The computer program device of claim 20, wherein each element further includes a name size preceding the name, the name size indicating a size of the associated name.

22. The computer program device of claim 17, wherein the message includes at least one node element representative of a respective node and at least one leaf element representative of a respective leaf, and further wherein each element further includes one of only two data types, node and leaf.

23. The computer program device of claim 17, wherein the message includes at least one node element representative of a respective node and at least one leaf element representative of a respective leaf, and further wherein each leaf element further includes a value representing a value of the associated leaf.

24. The computer of claim 7, wherein the message is arranged in accordance with the depth first traversal of the tree to represent tree structure information.

25. The method of claim 9, comprising arranging the message elements in accordance with the traversing act to represent tree structure information.

26. The computer program device of claim 16, wherein the message is arranged to represent information about the structure of the tree.

* * * * *